Nov. 7, 1967  I. J. DAVIES  3,351,382
SAFETY HARNESSES FOR VEHICLE OCCUPANTS
Filed April 20, 1966  2 Sheets-Sheet 1

Inventor
Ivor John Davies
By Dowell M Dowell
Attorneys

Nov. 7, 1967  I. J. DAVIES  3,351,382
SAFETY HARNESSES FOR VEHICLE OCCUPANTS
Filed April 20, 1966  2 Sheets-Sheet 2

Inventor
Ivor John Davies
By
Dowell & Dowell
Attorneys

United States Patent Office 3,351,382
Patented Nov. 7, 1967

3,351,382
SAFETY HARNESSES FOR VEHICLE OCCUPANTS
Ivor John Davies, Essex, England, assignor to Teleflex Products Limited, Essex, England, a British company
Filed Apr. 20, 1966, Ser. No. 543,943
Claims priority, application Great Britain, Apr. 21, 1965, 16,874/65
6 Claims. (Cl. 297—389)

ABSTRACT OF THE DISCLOSURE

A safety harness for a seat-occupant in a vehicle, comprising a lap strap extending between low level anchorage points on opposite sides of the seat and comprising two portions which can be joined and disconnected by a harness connector, and a diagonal or breast strap extending from the harness connector up to an elevated anchorage at one side of the seat, the breast strap being in one continuous length of strapping with the portion of the lap strap that extends to the low level anchorage on the same side as the elevated anchorage, the webbing forming the breast strap and one portion of the lap strap passing through a snubbing buckle on the harness connector, which buckle automatically locks the strap against movement therethrough in either direction under tension in either length of the webbing.

Figure 1:
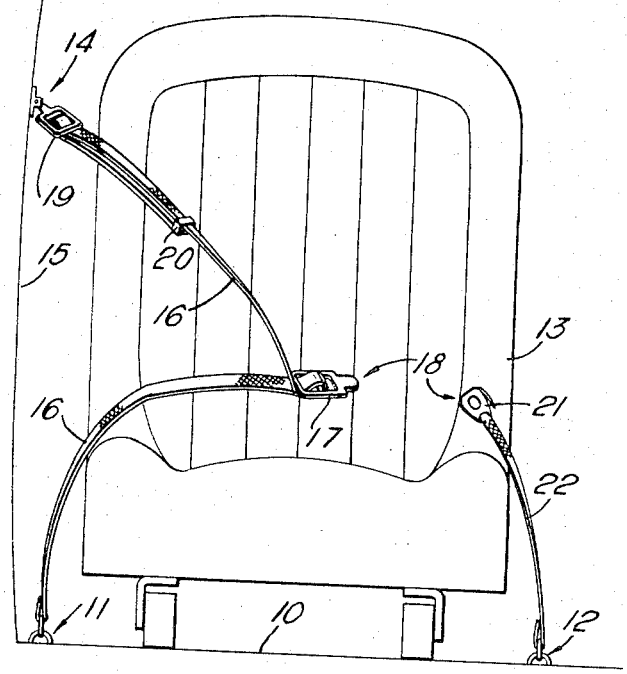

This invention relates to safety harnesses for the occupants of vehicles, and especially travellers in motor cars.

A well known form of safety harness used in motor vehicles is the lap-and-diagonal harness, comprising a lap strap extending across the wearer's lower torso or hips between low level anchorage points on either side of the seat, and a diagonal or breast strap uniting with the lap strap at an intermeidate point along the latter and extending up and across the wearer's chest to an elevated anchorage at one side of the seat usually on a door pillar of the vehicle. While a harness of this type can provide good restraint the fastening, correct adjustment and tensioning, and subsequent divesting, of the harness straps by the wearer tends to be a rather complicated series of operations which some wearers cannot perform unaided or are disinclined to perform. Also the harness fastenings are often cumbersome, and the straps tend to lie untidily on the floor of the vehicle when the harness is not in use. This invention therefore seeks to improve the lap-and-diagonal type of harness in at least some of these respects. The diagonal or breast strap is normally in one width, i.e., a continuation of, one portion of the lap strap extending from a harness connector down to one of the floor anchorages, e.g., the floor anchorage lying on the same side of the seat as the elevated anchorage for the breast strap; the harness connector is in two separable parts the other part being on the free end of the second portion of the lap strap extending up from the other floor anchorage. It is an object of the invention to provide a lap-and-diagonal harness of this type in which the webbing forming the breast strap and one portion of the lap strap passes through a snubbing buckle on the harness connector and said snubbing buckle automatically locks the strap against movement through the buckle in either direction under tension in either length of the webbing. That is to say, the buckle forms the dividing point along the webbing, variable in position, between the breast strap and the lap strap and, by reason of its locking capability, acts as an isolator in preventing tension from being transmitted through the webbing from either the breast strap portion to the lap strap portion or from the lap strap portion to the breast strap portion.

The advantage of this arrangement is that, whereas in the prior art the application of a sudden tension to the breast strap, for example due to the wearer being thrown forward in his seat, has resulted in transference of that tension through the buckle to the lap strap, with consequent complementary tightening of the lap strap and constriction of the wearer's abdominal region, in the present instance due to the snubbing action of the buckle there is no transference of tension from the breast strap to the lap strap or conversely from the lap strap to the breast strap.

Another object of the invention is to provide a harness of the type defined in which the upgoing length of webbing passes through a similar snubbing buckle at the elevated anchorage and is then doubled back on itself to end at a running loop on the upgoing portion. This enables the breast strap to be tightened independently of the lap strap.

Another object of the invention is to provide a harness of the type defined in which the second portion of the lap strap, that is to say, the length of webbing that is not in one with the breast strap, is stiffened by means of resilient longitudinal inserts, for example, of metal. By making the second portion of the lap strap stiff in this way it can be retained tidily at the side of the seat instead of wandering loosely and untidily about the floor of the vehicle.

Figure 2:
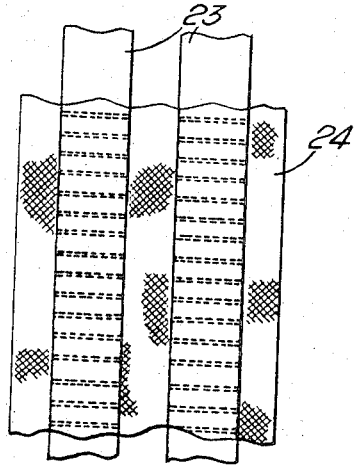
Figure 3:
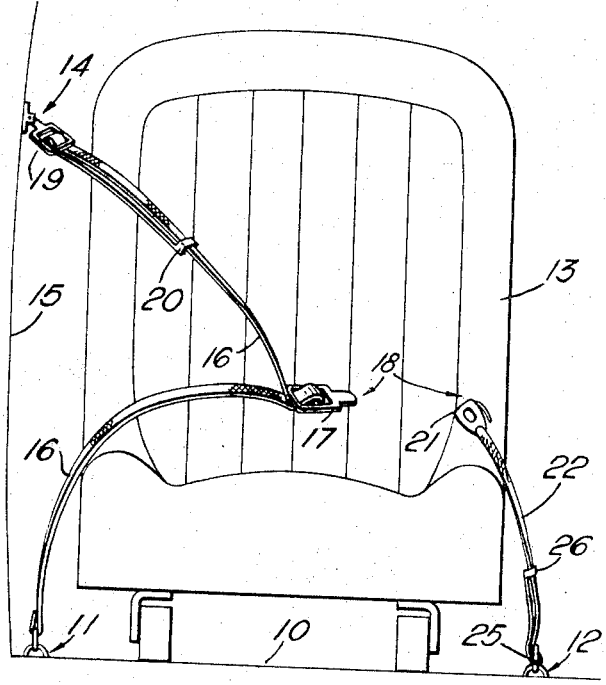
Figure 4:
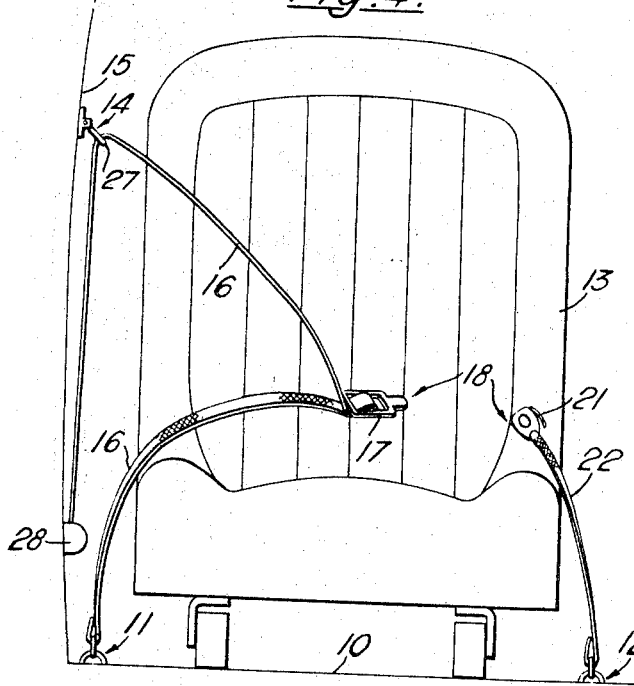

Arrangements in accordance with the invention will now be described by way of example and with reference to the accompanying drawings, in which:

FIGURE 1 is a diagrammatic view showing the general arrangement of safety harness in a vehicle, FIGURE 2 shows detail of one of the harness straps, FIGURE 3 illustrates a modification of the harness, and FIGURE 4 illustrates a further modification.

Referring firstly to FIGURE 1, this shows diagrammatically, and in the direction looking from front to rear, a safety harness according to the invention fitted in a vehicle in association with a seat.

Two anchorages 11, 12 are provided on the vehicle structure 10 at or about floor level for each harness, these anchorages being positioned one on each side of the seat 13. A third anchorage 14 is provided at an appropriate height on the door pillar 15 or some other strong part of the vehicle side structure. A continuous flexible harness strap 16 leads from the floor anchorage 11 lying on the same side of the seat 13 as the door pillar 15, through a snubbing buckle 17 on a harness connector 18 at an intermediate position along the strap, up to the door pillar anchorage 14 and through a second snubbing buckle 19 attached thereto, and down parallel to itself to end at a running loop 20 on the upgoing portion of the strap intermediate the two snubbing buckles 17, 19. The harness connector 18 is one part of a two-part device for releasably securing two straps together. The second part 21 of this device is at the free end of a second shorter strap 22 which has its other end secured to the floor anchorage 12 on the opposite side of the seat.

The lap strap is formed in part by the second strap 22 and in part by the portion of the first strap 16 that lies between the harness connector 18 and the floor anchorage 11 on the door pillar side. The length of this lap strap is adjusted by running the first strap 16 through the buckle 17 on the harness connector 18. The remaining portion of the first strap 16, from the harness connector 18 to the door pillar anchorage 14, forms the breast or diagonal strap, and the length of this is adjusted, after adjustment of the lap strap, by running the strap through the buckle 19 in the door pillar anchorage. Both snubbing buckles 17, 19 are of a type which locks the strap against being pulled through the buckle when the strap is under tension. A suitable known type of snubbing buckle comprises one or more fixed bars and a movable or sliding snubbing bar around which the strap is threaded so that tension in either length of the strap draws the movable bar against a fixed bar and grips the strap.

Besides being simple the harness described has several other especially desirable features. Thus, it is easy to don and adjust, the lap and breast straps being tightened separately. Because of the locking buckle 17 on the harness connector 18 there is no transference of tension between the lap strap and the breast strap, and indeed the harness may be worn with the lap strap taut and the breast strap loose.

It is convenient to make the shorter strap 22 a stiff strap rather than flexible, so that it does not wander loosely about the centre of the car floor. This can be achieved by the incorporation of longitudinal strips of, for example, tempered steel 23 into the strap webbing 24 during manufacture, as shown in FIGURE 2. It is important that the stiffening strips 23 should be well covered by the webbing material 24 so that they will not wear through it, and even more important that the stiffening strips 23 be of a strong somewhat resilient material that will not break and poke through the webbing.

Various modifications of the arrangement described are possible without departing from the scope of the invention. Thus, as shown in FIGURE 3, there may, if desired, be a third snubbing buckle 25 connected to the floor anchorage 12 lying on the opposite side of the seat to the door pillar, the second lap strap 22 on that side then being extended to pass through this buckle and being doubled back on itself to end in a running loop 26 on the downgoing length of the strap in an arrangement similar to that employed for the upper end of the breast strap. This makes possible adjustment of the length of the second part of the lap strap; in this case, however, a longitudinally stiffened strap is not employed.

With either of the harness arrangements described the anchorages may be designed to permit ready attachment and removal of the harness straps. One way of doing this is by fixing eye-bolts to the vehicle's structure at the anchorage points 11, 12, 14, the corresponding strap end or snubbing buckle, as the case may be, then being coupled to each eye-bolt by means of a snap-hook.

So far only harness arrangements of the fixed type have been mentioned in which once the wearer has adjusted the strap lengths they remain fixed until the wearer releases himself. Nevertheless the invention can likewise be applied to a harness in which there is a live length of strap which is paid out and reeled in to accommodate movements of the wearer relative to the seat. To this end, instead of terminating it in the region of the upper anchorage 14 the breast strap may pass through a running buckle or slip ring 27 at that anchorage (FIGURE 4) and then extend down the side of the vehicle to a harness reel 28 mounted, for example, on the vehicle structure at or near floor level. The reel 28 may be a so-called inertia reel to render the harness automatic; that is to say, the reel is designed to allow the strap to reel out, against the action of the reel spring but otherwise freely, during normal conditions but to lock and prevent more strap being paid out in response to an abnormal acceleration of the vehicle, or an abnormal angular acceleration of the reel due to pull of the strap, or both. Alternatively, the reel can be of a simpler type which is not automatic in the sense of being acceleration-responsive but which, while normally preventing unreeling of the strap, can be unlocked manually by the wearer of the harness to permit the strap to reel off for so long as the manual control is held in an operative position.

I claim:
1. A safety harness for a seat-occupant in a vehicle, comprising a lap strap extending between low level anchorage points on opposite sides of the seat and in two portions which can be joined and disconnected by a harness connector, and a diagonal or breast strap extending from the harness connector up to an elevated anchorage at one side of the seat, the breast strap being in one continuous length of strapping or webbing with the portion of the lap strap that extends to the low level anchorage on the same side as the elevated anchorage, characterised by the fact that the webbing forming the breast strap and one portion of the lap strap passes through a snubbing buckle on the harness connector, said snubbing buckle automatically locking the strap against movement through the buckle in either direction under tension in either length of the webbing.

2. A hardness according to claim 1, wherein the upgoing length of breast strap webbing passes through a similar snubbing buckle at the elevated anchorage and is then doubled back on itself to end at a running loop on the upgoing portion.

3. A harness according to claim 1, wherein the breast strap passes through a running buckle or slip ring at the elevated anchorage and then down to a harness reel for reeling in and paying out strap.

4. A harness according to claim 1, wherein the second portion of the lap strap, separate from the breast strap, is a stiff strap.

5. A harness according to claim 4, wherein the stiff strap has internal stiffening strips of a strong, somewhat resilient material such as tempered steel.

6. A harness according to claim 1, wherein the second portion of the lap strap, separate from the breast strap, passes through a snubbing buckle at its associated low level anchorage and is then doubled back on itself to end at a running loop on the down going length.

References Cited

UNITED STATES PATENTS

| | | | |
|---|---|---|---|
| 2,864,437 | 12/1958 | Spring | 280—150 |
| 3,043,625 | 7/1962 | Bohlin | 297—389 |
| 3,172,701 | 3/1965 | Weman | 297—389 |
| 3,236,540 | 2/1966 | Berton et al. | 297—389 X |
| 3,243,233 | 3/1966 | Davis | 297—389 |
| 3,258,293 | 6/1966 | Sharp | 297—389 |

JAMES T. McCALL, *Primary Examiner.*